April 14, 1931.   C. E. MAYNARD   1,800,462
CEMENTING DEVICE FOR SPLICING TUBES
Filed Oct. 29, 1926   2 Sheets-Sheet 1
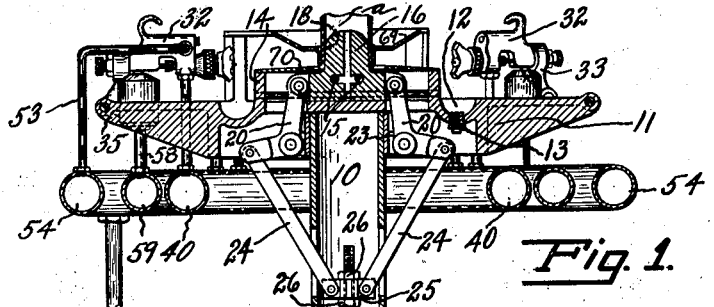
Fig. 1.
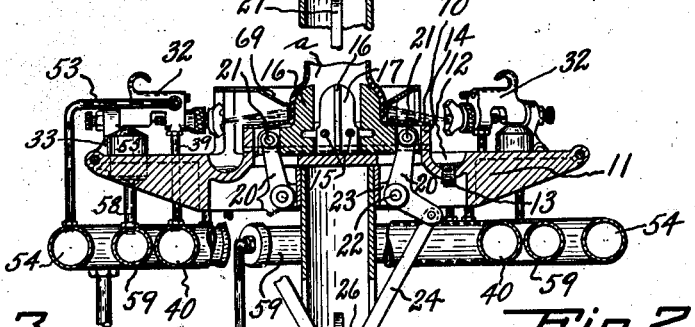
Fig. 2.
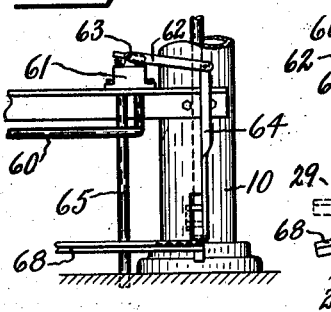
Fig. 3.
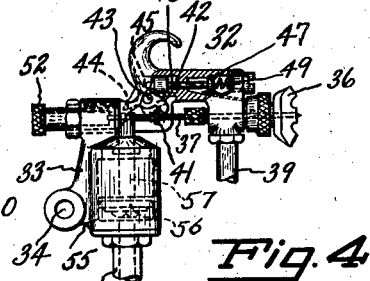
Fig. 4.
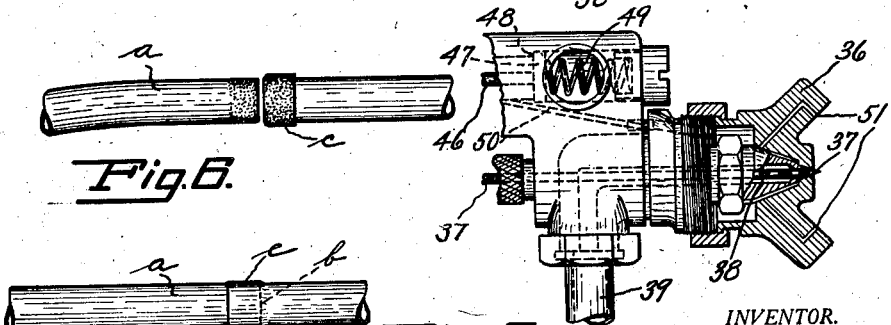
Fig. 6.
Fig. 5.
Fig. 7.
INVENTOR.
Charles Edgar Maynard
BY
Edward C. Taylor
ATTORNEY.

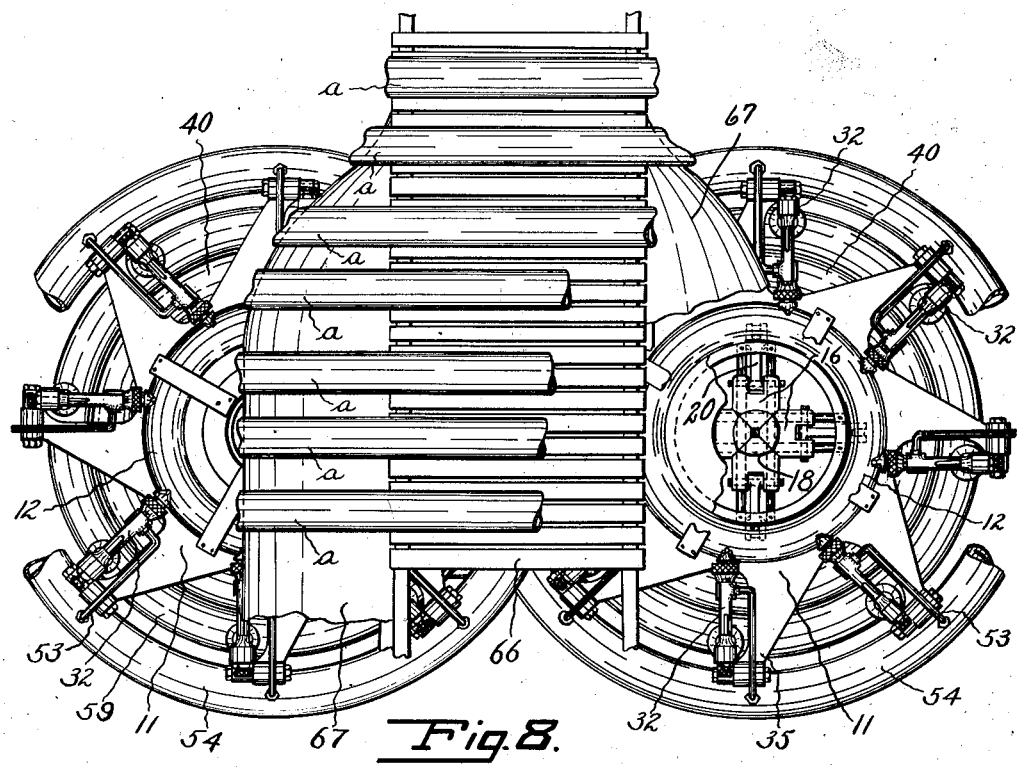
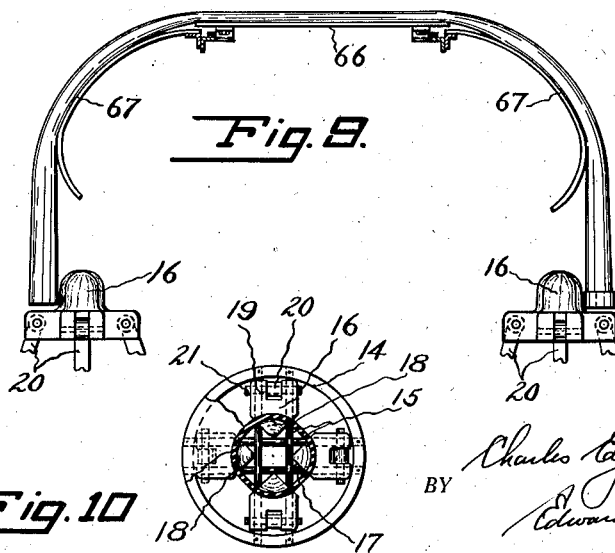

Patented Apr. 14, 1931

1,800,462

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

CEMENTING DEVICE FOR SPLICING TUBES

Application filed October 29, 1926. Serial No. 144,950.

This invention relates to an apparatus for cementing the ends of rubber tubes preparatory to splicing. It has for its object to provide an apparatus of this character which will apply quickly and substantially automatically a coating of cement or other adhesive composition to the ends of the rubber tubes. It has for its further object the elimination of the necessity of applying the cement by the slow and unsatisfactory method of brushing which is now commonly used. It has for a further object the provision of an apparatus adaptable for use in connection with a conveyor which carries the tubes past buffing, cementing, and drying stations to the final splicing point. It has for a further object the provision of an apparatus of this character in which both ends of the tubes can be coated with cement simultaneously and by a single operator. It has for a further object the provision of an apparatus which will stretch the rubber at the ends of the tubes while the cement is being applied.

In accordance with these objects, I have shown in the accompanying drawings a machine capable of cementing the tubes automatically on both ends as the tubes are led past it upon a conveyor. Referring particularly to the drawings, Fig. 1 is a vertical section through one of the cementing devices;

Fig. 2 is a similar view showing the parts in a different operative position;

Fig. 3 is a detail view looking from the left in Fig. 2;

Fig. 4 is an enlarged detail of one of the cement-spraying devices;

Fig. 5 is a detail, still further enlarged and in partial section, of the device shown in Fig. 4;

Fig. 6 is a view of a cemented tube prior to splicing;

Fig. 7 is a view of the tube after splicing;

Fig. 8 is a top plan view showing the manner in which two of the cementing devices are associated with a conveyor;

Fig. 9 is a diagrammatic end view of the apparatus shown in Fig. 7; and

Fig. 10 is a top plan detail of the parts as shown in Fig. 2.

Although my invention may be embodied in various forms, the one illustrated is composed of two identical machines, each comprising an annular spraying device and a centrally disposed head upon which the end of the tube may be placed, the head being expansible to stretch the tube at its end. The spraying device consists of a number of units, annularly arranged, which atomize the cement or other splicing material and throw it against the end of the tube. The expanding head and the spraying devices are actuated by a common control so that, when the control is operated, the tube will be stretched and the cement applied in a very short space of time and without detailed attention on the part of the operator.

Each of the splicing devices, of which two are preferably used in connection with a single tube conveyor, is carried upon a vertical base of hollow construction. Mounted at the top of the base 10 is a generally circular casting 11 upon which the expanding and spraying devices are mounted. Upon the upper surface of this casting is a channel 12 having a drain plug 13 therein serving to collect any surplus cement which has not adhered to the tube. On the inner edge of this channel is a vertically extending flange 14 forming a circular enclosure in which rods 15 are mounted (see particularly Fig. 9). Slidably mounted upon these rods are blocks 16 having surfaces 17 cut on a bevel so that when the blocks are caused to approach one another, as in Figs. 1 and 8, they will lie very closely together. The outer periphery 18 of the blocks is formed so that the blocks in their entirety form a circle when in the closed position of Fig. 8. A slot 19, formed in a horizontally extending portion of each block, receives one arm of a bell-crank 20 pivoted to the block by a pin 21. The bell-crank itself is pivoted at 22 to a bracket 23 on the upper end of the base 10. Each bell-crank carries pivoted to its other end a link 24 connected to a cross-head 25 carried upon a rod 27 and moving vertically within the hollow base 10, being held in adjusted vertical position on the rod by nuts 26. The lower end of the rod is pivoted at 28 to a treadle 29 carried upon a bracket 30 and held normally in a raised position by means of a spring 31.

The parts so far described function to receive the end of a tube a, and to expand it preparatory to the application of the cementing material. If the treadle 29 is depressed into the position of Fig. 2, the crosshead 25 will be drawn down and the bell-crank 20 rocked from the position of Fig. 1 to that of Fig. 2. This causes the blocks 16 to slide outwardly upon the rods 15 and to stretch the rubber at the end of the tube a considerable amount. When the treadle is released, the bell-cranks are caused to rock into the position of Fig. 1 by the action of spring 31, and the blocks are thereby drawn together as in Figs. 1 and 7. The actuation of the treadle 29 likewise serves to operate the spraying apparatus now to be described.

The spraying of the cement upon the ends of the tube is accomplished by spray guns of a commercial type illustrated and described in this case conventionally and indicated in the drawings by 32. One of the guns is shown in partial section in Figs. 4 and 5 and the piping is shown in Figs. 2 and 3. Each gun is carried upon a frame 33 bolted at 34 to bracket 35 upon the circular casting 11. At the inner end of the gun is mounted a nozzle 36 provided with a needle valve 37 extending as a rod through the gun. Surrounding the needle valve at the inner end of the gun is a passage-way 38 leading into a cement-supplying pipe 39 which in turn is connected with a manifold 40. A permanent supply of cement or other adhesive material is connected to the manifold 40 under sufficient pressure to insure a supply to the gun at all times. This supply is normally shut off by the needle valve 37, the latter being actuated to release the cement by mechanisms to be described later.

A collar 41 upon the rod of the needle valve is engaged by a finger 42 pivoted to the frame at 43 and formed integrally with other fingers 44 and 45. Sliding in the frame parallel to the needle valve rod 37 is a rod 46 carrying a piston 47 and, engaged by the fingers 45, moves to the right in Figs. 4 and 5 by the same motion around pivot 43 that causes finger 42 to move the needle valve to the left. Movement of the piston 47 to the right in Fig. 4 and Fig. 5 uncovers a port 48. The movement of the piston to the right is normally resisted by a spring 49 which also serves to return the piston to the position of Fig. 4 upon the release of the actuating means. To the left of the piston 47 is a chamber connecting with the nozzle through a passage-way 50 which diverges when it reaches the nozzle and leads both to an annular opening around the needle valve and to small holes 51 pointing in a converging manner toward the atomized jet issuing through the hole around the needle valve. The jets of air which come through the holes 51 serve to flatten the stream of atomized cement and to give a smooth blend between the several jets issued from the several nozzles. The extent of the opening of the needle valve is controlled by an adjustment 52, which is not necessary to be described in detail for the purposes of this case. Air under pressure is supplied to the port 48 through a pipe 53 (Fig. 2) which communicates with a manifold 54 having suitable connections whereby air under pressure is present at all times during the operation of the machine.

Likewise mounted upon the frame 33 is a cylinder 55 having a piston 56 working therein, this piston controlling the operation of those parts of the gun already described. Connected to the piston is a rod 57 which actuates finger 44 as the piston is raised, thereby causing finger 42 to move the needle valve to the left and finger 45 to move the piston to the right. Air under pressure is supplied to the lower end of the cylinder 55 through a pipe 58 which communicates with a manifold 59. A pipe 60 leads from this manifold to a valve 61 mounted upon the base 10 and actuated by a lever 62 pivoted to the base at 63. A link 64 connects this lever with the treadle 29 already described, so that when the treadle is depressed, as in Fig. 2, the valve will be opened and air under pressure admitted to the manifold 59. By this construction a single valve 61 controls simultaneously the action of all of the spray guns.

In the preferred arrangement of the spraying devices two of them, as shown in Fig. 8, are mounted side by side on opposite sides of a slat conveyor 66. At points adjacent the cementing machine side guides 67 are mounted so as to deflect side portions of the tube a to a point near the expanding blocks 16. The operator is seated near the two machines at a point underneath the slat conveyor. As the tubes pass he takes an end of the tube in each hand and places the respective ends upon the then contracted blocks 16. By stepping upon a rail 68, connecting the treadles of the two machines, the blocks 16 of the two machines are simultaneously expanded and, when their motion of expansion is complete, the valve 61 operated to admit air to the manifold 59 and cause actuation of all of the spray guns. After a sufficient time has elapsed to thoroughly cement the two ends the bar 68 is released and the tubes allowed to contract, the action of the spray automatically ceasing at the same time.

The preferred method of splicing is shown in Figs. 6 and 7 where one end c is cuffed back upon itself and the other left straight. As the tubes are introduced into the machine the ends will receive a coating of cement shown in Fig. 6 by the stippling. Unintentional distribution of the cement upon other parts of the tube is prevented by annular guides 69 and 70 mounted to surround the tube closely when the latter is expanded as shown in Fig. 2. After the cement has been dried, as by passing through a suitable oven while on the flat conveyor 66, the cuffed portion of the tube is bent back upon the portion $b$, as shown in Fig. 6.

Having thus described my invention, I claim:

1. A tube end cementing apparatus comprising a plurality of movable blocks presenting in their assembly a generally cylindrical surface adapted to be projected within the end of a tube, means for separating the blocks to stretch the tube end, and means for applying cementing material to the tube end while the latter is so stretched.

2. A tube end cementing apparatus which comprises an annular series of atomizing devices positioned to discharge inwardly converging sprays of cementing material, and means for stretching a tube end and holding it in position to receive the sprays.

3. A tube end cementing apparatus which comprises a conveyor adapted to support the central portions of a series of tubes with the end portions thereof free, a pair of tube end receiving devices positioned adjacent the path of movement of the free tube ends, and annularly arranged spraying devices positioned about each receiving device.

4. A tube end cementing apparatus which comprises a conveyor adapted to support the central portions of a series of tubes with the end portions thereof free, a pair of tube end receiving and stretching devices positioned adjacent the path of movement of the free tube ends, annularly arranged spraying devices positioned about each receiving and stretching device, and common means for actuating the several devices simultaneously to stretch the tube ends and spray a coating of cementing material thereon.

5. A tube end cementing apparatus comprising means for stretching the end of the tube, means for applying cementing material to the end of the tube while so stretched and means to confine the cement application to the stretched portion of the tube.

6. A tube end cementing apparatus comprising means for stretching the end of the tube, means for applying cementing material to the end of the tube while so stretched and an annular member positioned concentrically with respect to the tube stretching means and closely surrounding the tube when the latter is in stretched condition to limit the distribution of cement to the stretched portion of the tube.

7. A tube end cementing apparatus comprising means for stretching the rubber adjacent the end of the tube and means for applying cementing material to the rubber while so stretched, said stretching means being operable to release the rubber from its stretched condition upon completion of the cementing operation.

CHARLES EDGAR MAYNARD.